(12) United States Patent
Millet

(10) Patent No.: US 7,181,547 B1
(45) Date of Patent: Feb. 20, 2007

(54) IDENTIFYING NODES IN A RING NETWORK

(75) Inventor: Tim Millet, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 606 days.

(21) Appl. No.: 09/894,471

(22) Filed: Jun. 28, 2001

(51) Int. Cl.
| | |
|---|---|
| G06F 15/16 | (2006.01) |
| G06F 11/00 | (2006.01) |
| H04L 12/28 | (2006.01) |
| H04L 12/403 | (2006.01) |

(52) U.S. Cl. .................. 709/251; 370/222; 370/254; 370/258; 370/455; 710/107; 710/111

(58) Field of Classification Search ............... 370/258, 370/389, 356, 222
See application file for complete search history.

(56) References Cited

U.S. PATENT DOCUMENTS 5,568,525 A * 10/1996 de Nijs et al. .............. 375/356
6,269,099 B1 * 7/2001 Borella et al. .............. 370/389
6,304,557 B1 * 10/2001 Nakazumi ................... 370/258
6,785,224 B2 * 8/2004 Uematsu et al. ............ 370/222

* cited by examiner

*Primary Examiner*—Bunjob Jaroenchonwanit
*Assistant Examiner*—Philip Lee
(74) *Attorney, Agent, or Firm*—Hamilton & DeSanctis

(57) ABSTRACT

A master node in a packet ring network periodically sends a packet containing a discovery marker into the packet ring network. As each node in turn receives the packet, each adds its own discovery marker, which contains its topology information, to the packet, saves the topology information of others, and resends the packet to the next node in the ring. Eventually, the master node receives the packet containing a chain of discovery markers for all active nodes terminated by the master's own discovery marker, so the master node then removes its own discovery marker and resends the packet in to the ring network. Each node in turn then removes its own discovery marker. In this way, all nodes in the ring see topology information for every other active node.

17 Claims, 6 Drawing Sheets

IDENTIFYING NODES IN A RING NETWORK

FIELD

The present invention relates generally to computer networks and more particularly to the identification of nodes on a ring network.

BACKGROUND

The interest in the computer networks is growing every day, as more and more users want the capability to access information at remote locations. A computer network is composed of nodes and the communication links between the nodes. In order for a first node to access information at a remote node, the first node must have a way to know that the remote node exists. Thus, the nodes in the network need configuration information that describes the topology of the other nodes in the network.

In prior networks, a predetermined master node would send a query to every node address asking whether a node exists at that address. When the master node received acknowledgments back, it would then know at which addresses other nodes existed. Whenever nodes were added to or removed from the network, the master node needed to repeat these queries to determine the new node topology, which was a time-consuming task. Thus, these prior networks suffered from heavy network traffic and performance problems. Further, if the master node was removed or disabled, the network had no way of determining the network topology.

Hence, there is a need for a solution that overcomes the problems of the prior art and provides an improved technique for determining network topology.

SUMMARY

The above-mentioned shortcomings, disadvantages and problems are addressed by the present invention, which will be understood by reading and studying the following specification.

Nodes in a packet ring network have assigned priorities, and the highest priority node assumes the role of the master node. The master node periodically transmits a packet containing a discovery marker into the packet ring network. As each node in turn receives the packet, each adds its own discovery marker, which contains its topology information, to the packet, saves the topology information of others, and resends the packet to the next node in the ring. Eventually, the master node receives the packet containing a chain of discovery markers for all active nodes terminated by the master's own discovery marker, so the master node then removes its own discovery marker and resends the packet in to the ring network. Each node in turn then removes its own discovery marker. In this way, all nodes in the ring see topology information for every other active node.

DETAILED DESCRIPTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following detailed description is, therefore, not to be taken in a limiting sense.

In the figures, the same reference number is used throughout to refer to an identical component which appears in multiple figures. Signals and connections may be referred to by the same reference number or label, and the actual meaning will be clear from its use in the context of the description.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing," "computing," "calculating," "determining," "displaying," or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission, or display devices.

Figure 1:
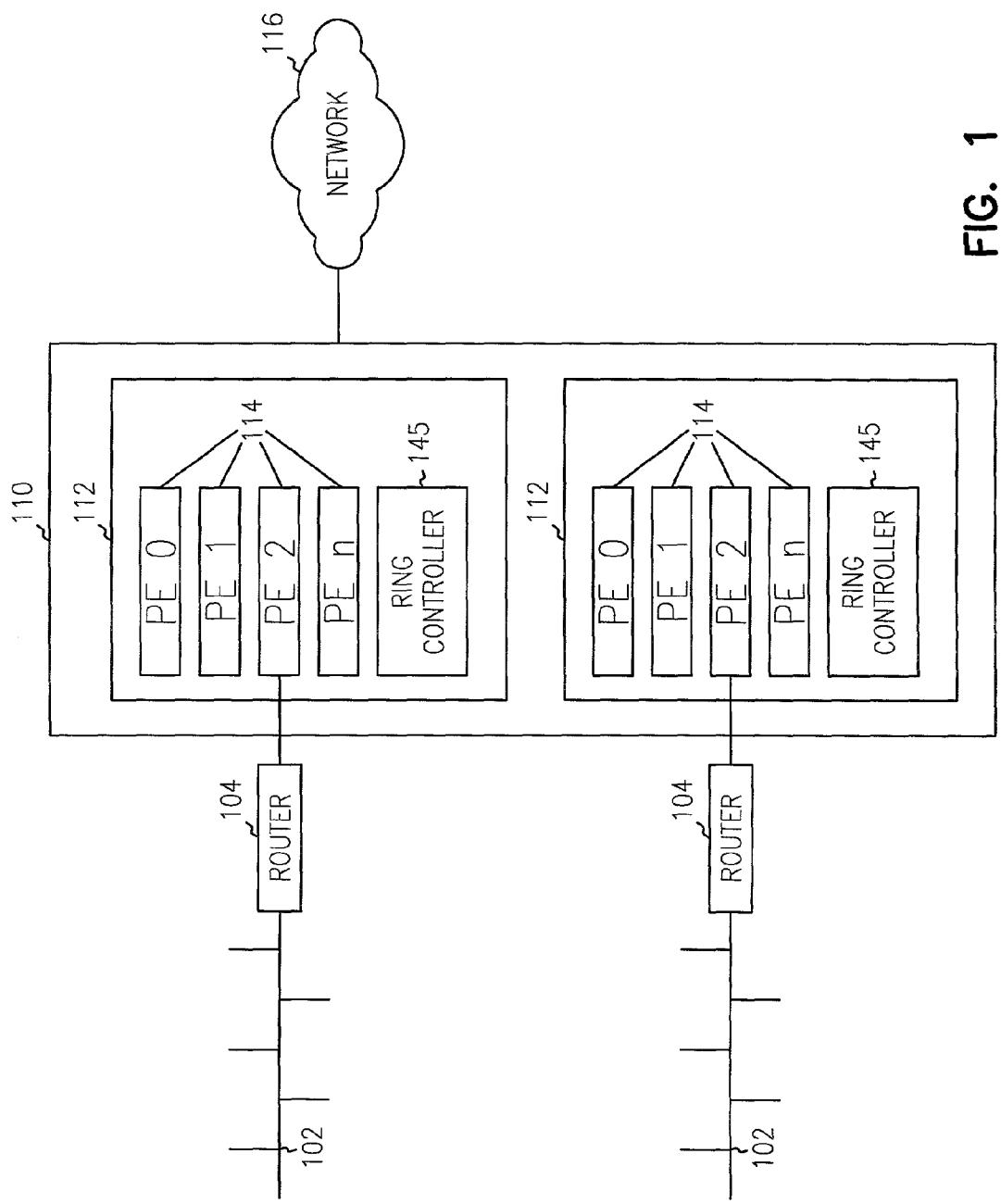
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, system 100 includes service processing switch 110, access routers 104, and network 116. In one embodiment, service processing switch 110 provides switching, routing, and computing resources that can be allocated by a service provider to customers. In one embodiment, service processing switch 110 is the IPSX 9000 service processing switch from CoSine Communications, Inc. But, the invention is not limited to any particular switch, router, or service processing hardware.

Service processing switch 110 includes one or more blades 112. In some embodiments, blades 112 have a type associated with them. Examples of blade types include processing functions such as network blades, control blades, trunk blades, and processor blades. Network blades provide interfaces to different types of networks. Control blades provide system management and accounting functions to service processing system 110. Trunk blades provide access to high speed trunk networks. Processor blades provide general purpose computer processors that in some embodiments provide firewall, intrusion detection, or directory services. Blades are communicably coupled to one another via a packet ring or rings, as further described below with reference to FIG. 2. Referring again to FIG. 1, each blade includes ring controller 145, which contains logic for interfacing to a ring network that connects the blades, as further described below with reference to FIGS. 3–5.

Referring again to FIG. 1, each of blades 112 includes one or more processing elements 114. Processing elements 114 include CPUs and memory that provide computing resources for the blade, as further described below with reference to FIG. 2. Referring again to FIG. 1, the invention is not limited to any particular number of processing elements on a blade, nor is the invention limited to any particular number of blades in a service processing switch 110. Software tasks, in some embodiments, are split up such that one processor operates on one part of the data and another processor operates on another part of the data. In other embodiments, the various processing portions of a task all run on a single processor, multiprocessing with other tasks that share that processor. Thus, the hardware provides scalability, where low-end systems include few processors that do all the work, and high-end systems include one hundred or more processors and the work is distributed among the processors for greater speed and throughput.

Service processing system 110 is typically communicably coupled to a network 116, for example the Internet. Network 116 can also be a Wide Area Network (WAN), a Local Area Network (LAN), or a private network. Service processing system 110 is also typically communicatively coupled to a plurality of customer networks 102 via customer access routers 104.

Figure 2:
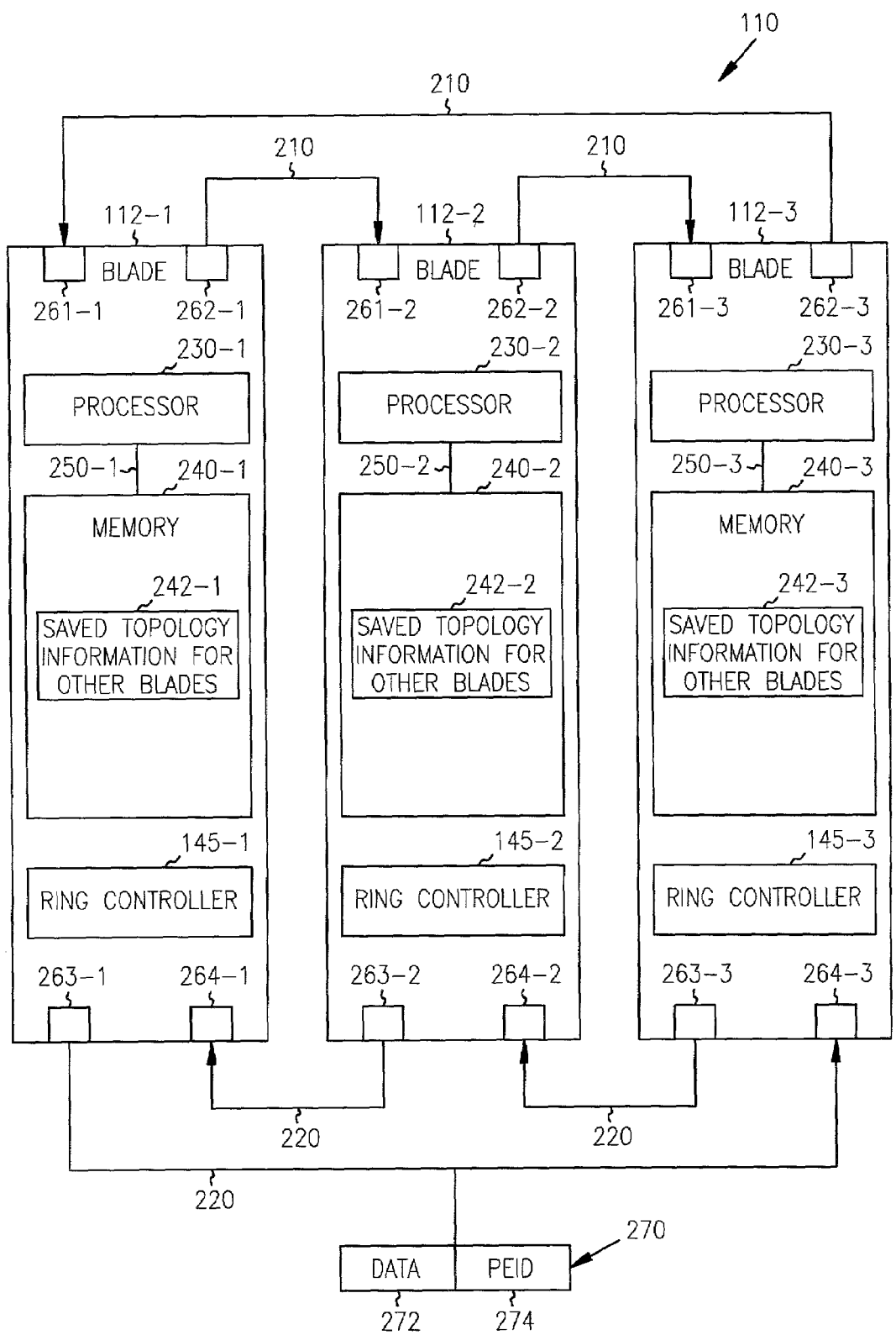
FIG. 2 is a block diagram of a multi-blade system connected via a ring network, according to an embodiment of the invention.

FIG. 2 is a block diagram of a multi-blade system connected via a ring network within service processing system 110, according to an embodiment of the invention. In some embodiments, each of two network rings 210 and 220 communicatively connect blades 112-1, 112-2, and 112-3 together. Although three blades are shown, in another embodiment any number can be present. Blade 112-1 contains processor 230-1 and memory 240-1 connected via system bus 250-1. Blade 112-1 also contains ring controller 145-1. Blade 112-2 contains processor 230-2 and memory 240-2 connected via system bus 250-2. Blade 112-1 also contains ring controller 145-2. Blade 112-3 contains processor 230-3 and memory 240-3 connected via system bus 250-3. Blade 112-1 also contains ring controller 145-3. Each blade optionally includes other hardware; for example although only one processor and memory are shown in the blades, each can contain multiple processors and multiple memories, as previously described above with reference to FIG. 1.

Referring again to FIG. 2, each memory 240-1, 240-2, and 240-3 contains respective topology information for the other blades 242-1, 242-2, and 242-3, which contains a discovery marker's connection state, the control blade master state, and blade characteristics. The topology information is further described below with reference to FIG. 5.

Referring again to FIG. 2, network ring 210 is a primary ring, which connects the blades in one direction, and network ring 220 is a protect ring, which connects the blades in the opposite direction. Primary ring 210 is used for normal packet transmission and reception, unless a break is detected in the ring as a result of blade failure or removal. When connection faults are detected, the affected blades begin using protect ring 220 to bypass the bad or missing connection. The packet ring hardware manages and discovers topology changes, and provides software with a current topology map, as further described below with reference to FIGS. 4 and 5.

Blade 112-1 contains primary-ring receive port 261-1, primary-ring transmit port 262-1, protect-ring transmit port 263-1, and protect-ring receive port 264-1. Blade 112-2 contains primary-ring receive port 261-2, primary-ring transmit port 262-2, protect-ring transmit port 263-2, and protect-ring receive port 264-2. Blade 112-3 contains primary-ring receive port 261-3, primary-ring transmit port 262-3, protect-ring transmit port 263-3, and protect-ring receive port 264-3.

Rings 210 and 220 are packet-passing rings. Each packet 270 placed in the rings includes a data portion 272 and a processor element identifier (PEID 274), which identifies the destination processor for the packet. If the PEID matches a processor on its particular blade, the blade 112 passes the packet to the proper processor; if not, the packet is forwarded to the next blade. Although packet 270 is shown as traveling in ring 220, it can also travel in ring 210.

Although the embodiment of FIG. 2 has been described in the context of a network of blades within a switch, the invention applies equally to any nodes in a network, whether the nodes are contained within the same housing, located within the same room, or situated vast geographical distances apart.

In the previous section, a system level overview of the operation of exemplary embodiments of the invention were described. In this section, the particular methods of the invention performed by an operating environment executing an exemplary embodiment are described. In one embodiment the methods to be performed constitute computer programs made up of computer-executable instructions. But, in other embodiments the methods can be implemented using hardware in lieu of a processor-based system. Describing the methods enables one skilled in the art to develop such programs including such instructions to carry out the methods on suitable computers (the processor of the computer executing the instructions from computer-readable media). Describing the methods also enables one skilled in the art to develop hardware to carry out the described methods.

Figure 3:
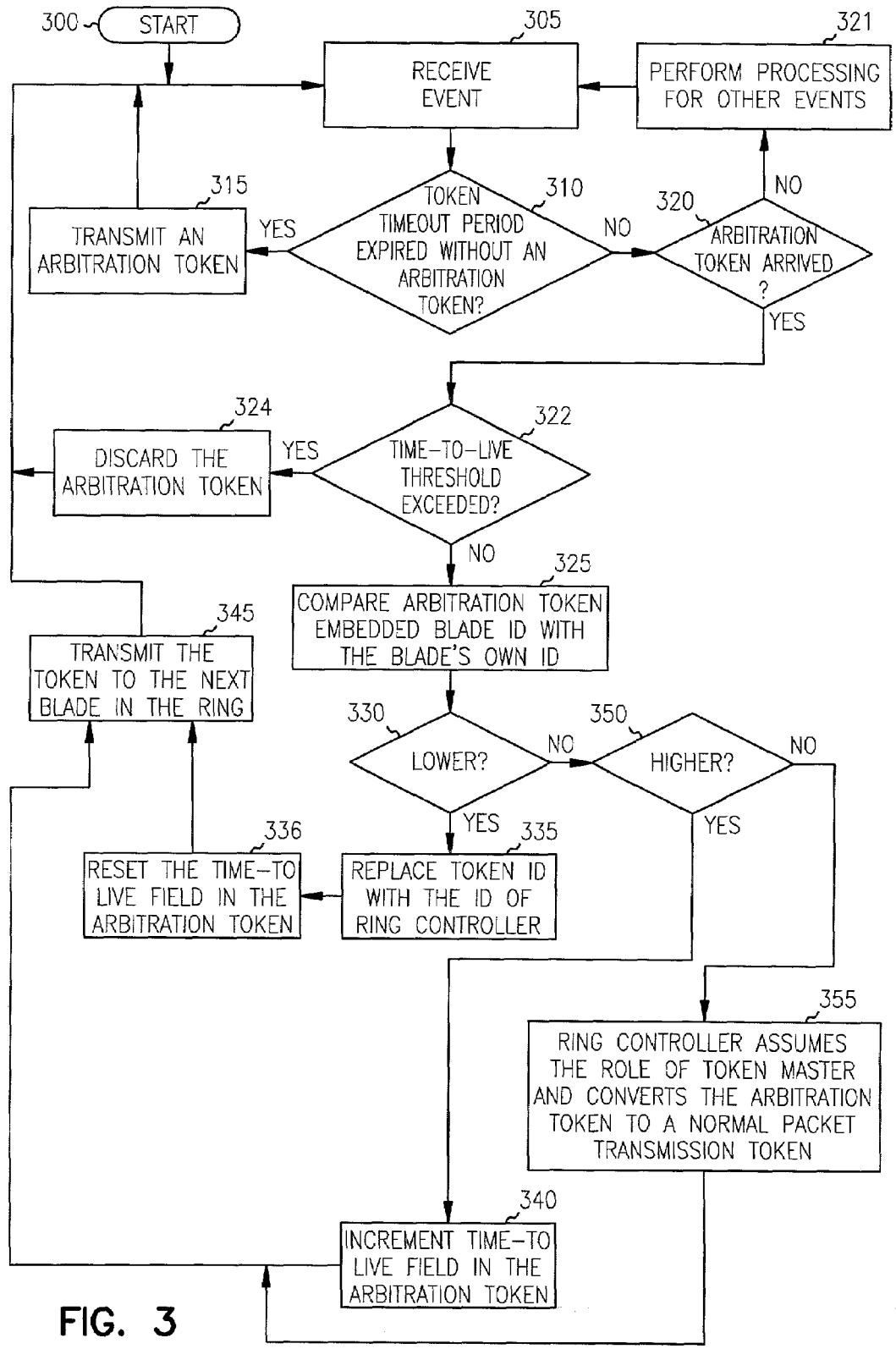
FIG. 3 is a flowchart of master blade arbitration logic, according to an embodiment of the invention.

FIG. 3 is a flowchart of token master blade arbitration logic, according to an embodiment of the invention. The functions described in FIG. 3 are carried out by any of blades 112. Packet rings 210 and 220 use a token arbitration scheme, allowing one blade (the blade that has most recently received a token marker) to transmit locally generated packets. A token marker is a one-cycle message with a unique encoding. At power-up, or after a connection state transition, a token may not be present in the packet ring. When this happens, a single blade takes responsibility for generating a token, so that packet transmission can proceed. This single blade is referred to as the token master blade, and the token master arbitration logic is described as follows.

Control begins at block 300. Control then continues to block 305 where an event is received at the blade. Control then continues to block 310 where blade 112 determines whether the event previously received at block 305 was a token timeout period expiration event. The token timeout period can expire, for example, when a blade insertion/removal event causes token loss or when no token has yet been generated following power-up.

If the determination at block 310 is true, then control continues to block 315 where blade 112 transmits an arbitration token on the ring network. In this way, a blade generates an arbitration token whenever a token timeout period has passed without detecting the arrival of a token. In one embodiment, the token timeout period is calculated by multiplying (max system blade count*(max packet delay+ring I/O latency)*clock period). In this token-based ring network, an arbitration token is passed around the nodes of the ring, and only the node that currently has the token has permission to send a packet on the ring. Control then returns to block 305, as previously described above.

If the determination at block 310 is false, then control continues to block 320 where blade 112 determines whether an arbitration token arrived event occurred at block 305. If the determination at block 320 is false, then control continues to block 321 where processing for other events occurs. Control then returns to block 305, as previously described above.

If the determination at block 320 is true, then control continues to block 322 where blade 112 determines whether the time-to-live field in the received arbitration token exceeds the time-to-live threshold. If the determination at block 322 is true, then control continues to block 324 where blade 112 discards the arbitration token. Control then returns to block 305 as previously described above.

If the determination at block 322 is false, then control continues to block 325 where blade 112 compares the arbitration token blade ID with its own local blade ID. From block 325, control continues to block 330 where blade 112 determines whether the arbitration token blade ID is a lower priority than the ring controller blade ID. If the determination at block 330 is true, then control continues to block 335 where blade 112 replaces the token blade ID with the ID of the ring controller. Control then continues to block 336 where blade 112 resets the time-to-live field in the arbitration token. Control then continues to block 345 where blade 112 transmits the token to the next blade in the ring. Control then returns to block 305, as previously described above.

If the determination at block 330 is false, then control continues to block 350 where blade 112 determines whether the arbitration token blade ID is at a higher priority than the ring controller blade ID. If the determination at block 350 is true, then control continues to block 340 where blade 112 increments the time-to-live field in the arbitration token. Control then continues to block 345, as previously described above.

If the determination at block 350 is false, then the arbitration token blade ID has an equal priority to the ring controller blade ID, so control continues to block 355 where blade 112 makes itself the token master blade and converts the received arbitration token to a normal packet transmission token. Thus, once the arbitration token previously generated at block 315 is passed all the way around the ring network and back to this blade unmodified by any higher priority blade, this blade becomes the master blade. Control then continues to block 345, as previously described above.

Figure 4:
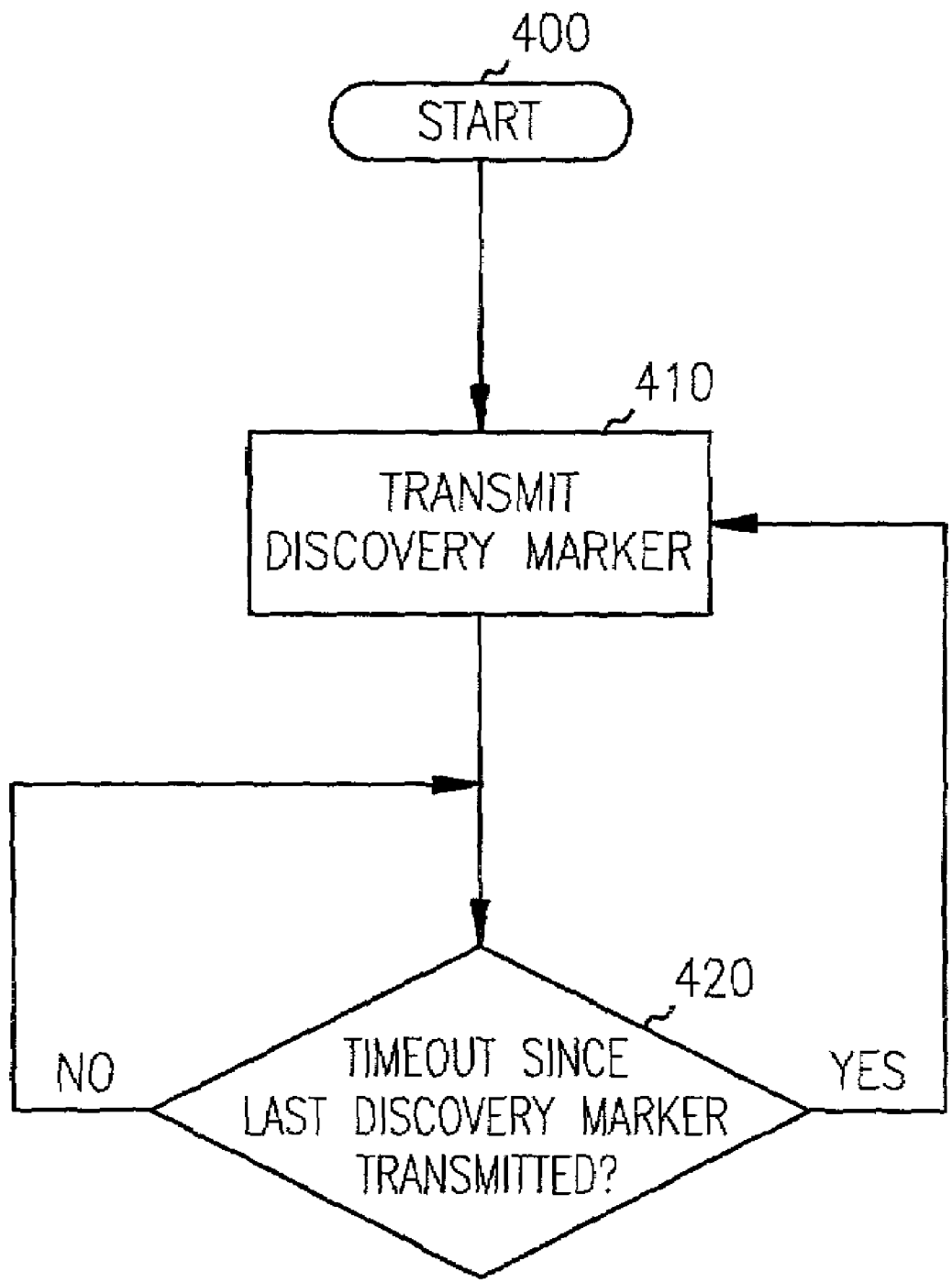
FIG. 4 is a flowchart of the master blade functions, according to an embodiment of the invention.

FIG. 4 is a flowchart of the token master blade functions, according to an embodiment of the invention. A blade became a token master blade as previously described above with reference to blocks 315 and 355. Control begins at block 400. Control then continues to block 410 where the master blade transmits a discovery marker. A discovery marker is further described below with reference to FIG. 6. Control then continues to block 420 where the master blade determines whether a period of time has expired since the last discovery marker was transmitted. If the determination at block 420 is false, then control returns to block 420. If the determination at block 420 is true, then control returns to block 410. In this way, the master blade periodically transmits a discovery marker.

Figure 5:
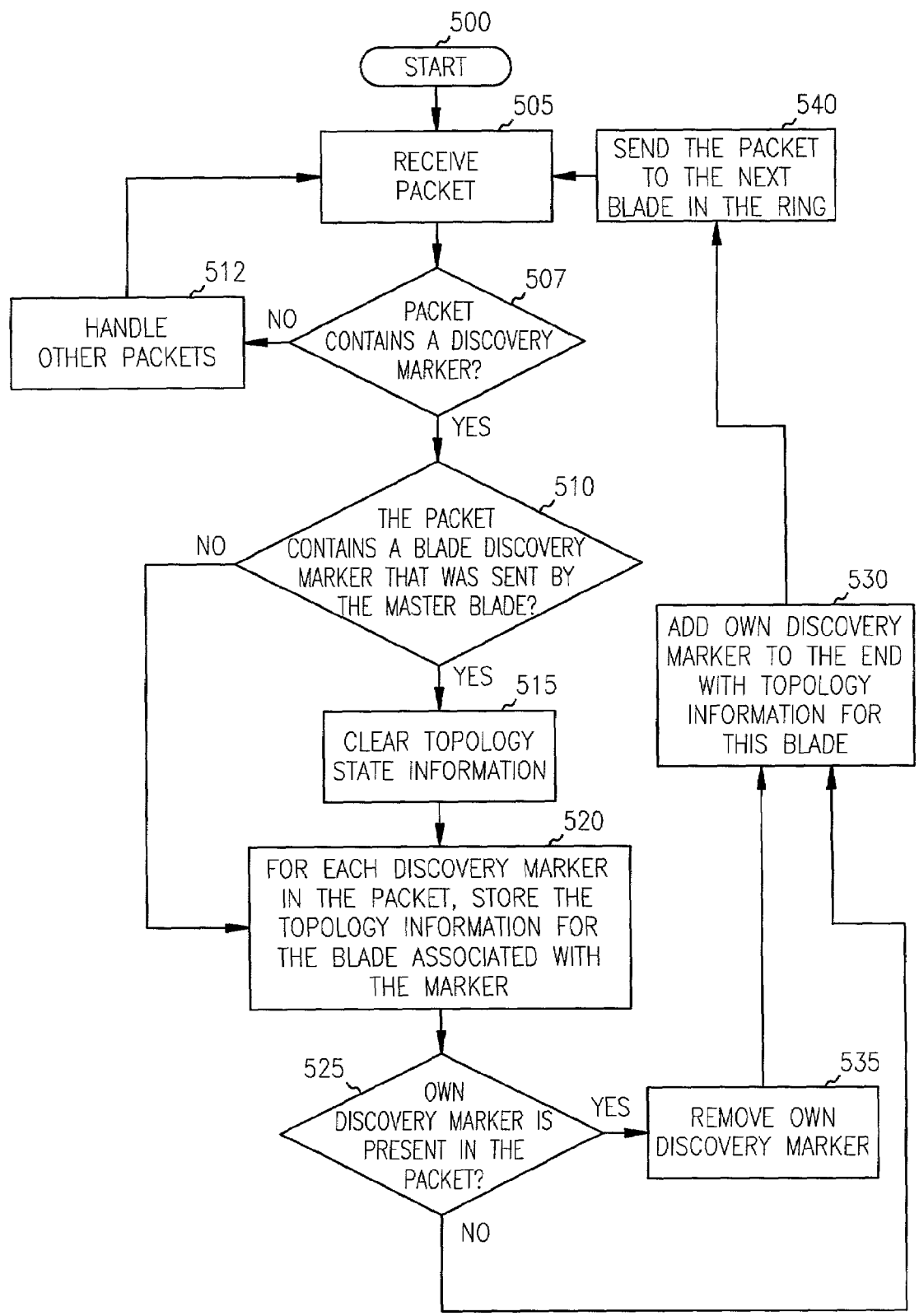
FIG. 5 is a flowchart of blade discovery logic, according to an embodiment of the invention.

FIG. 5 is a flowchart of blade discovery logic, according to an embodiment of the invention. Control begins at block 500. Control then continues to block 500 where blade 112 receives a packet from the packet ring. Control then continues to block 507 where blade 112 determines whether the packet contains any discovery markers. If the determination at block 507 is false, then control continues to block 512 where other types of packets are handled. Control then returns to block 505, as previously described above.

If the determination at block 507 is true, then control continues to block 510 where blade 112 determines whether any of the discovery markers in the packet were sent by the master blade. A blade discovery marker was sent at block 410, as previously described above with reference to FIG. 4.

Referring again to FIG. 5, if the determination at block 510 is true, then control continues to block 515 where blade 112 clears its topology information (242-1, 242-2, or 242-3, depending on the blade) for all known blades. Control then continues to block 520 where blade 112, for each marker in the packet, stores the topology information for the blade associated with the marker.

If the determination at block 510 is false, then control continues directly to block 520, as previously described above.

From block 520, control then continues to block 525 where blade 112 determines whether its own discovery marker is present in the packet. If the determination is false, then control continues to block 530 where blade 112 adds its own discovery marker to the end of the packet, including its own topology information. Control then continues to block 540 where blade 112 sends the packet to the next blade in the ring. Control then returns to block 505, as previously described above.

If the determination at block 525 is true, then control continues to block 535 where blade 112 removes its own discovery marker from the packet. Control then continues to block 530, as previously described above.

In this way all blades in the packet ring see a discovery marker and associated topology information for every other active blade.

Figure 6:
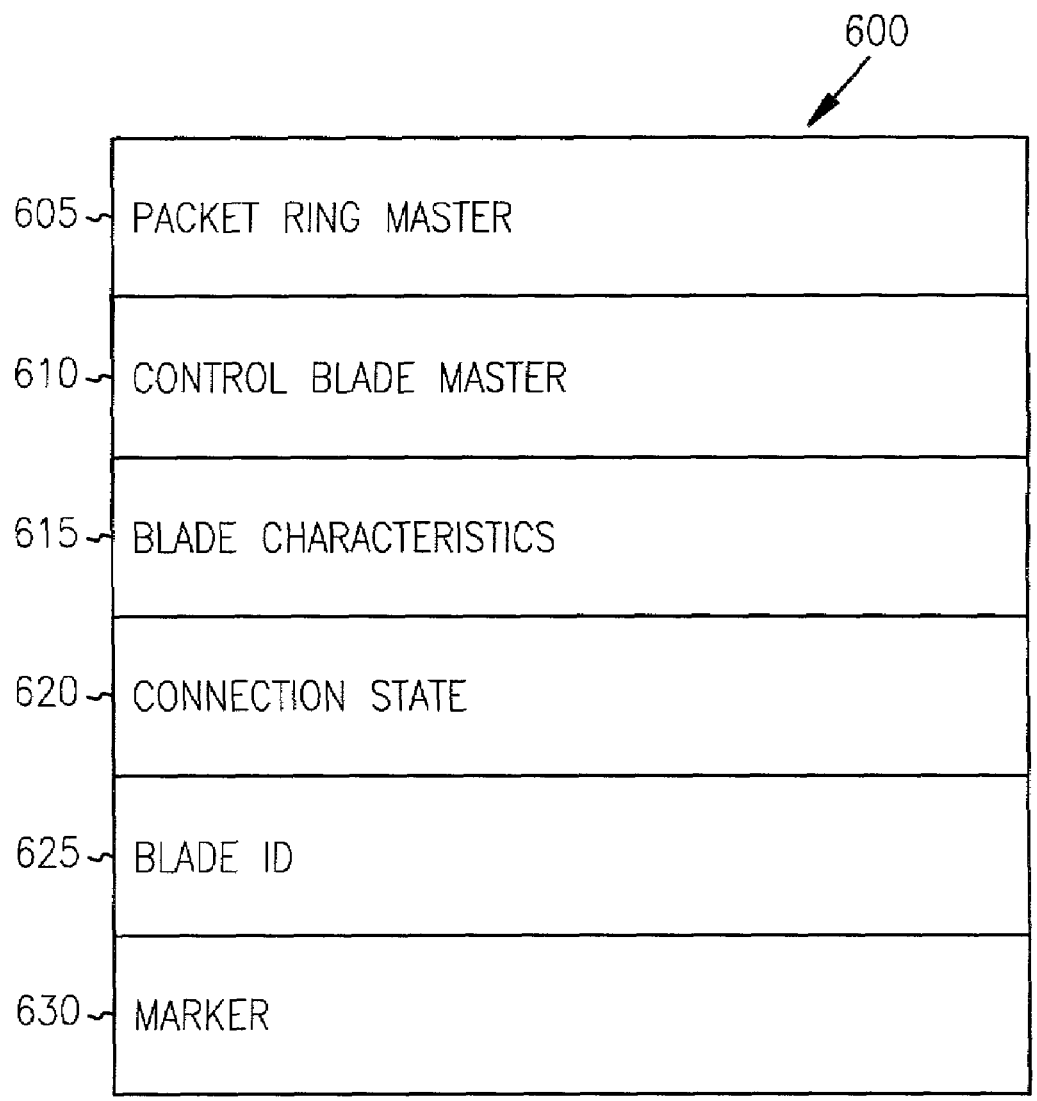
FIG. 6 describes a discovery marker data structure, according to an embodiment of the invention.

FIG. 6 describes discovery marker data structure 600, according to an embodiment of the invention. Discovery marker data structure 600 includes packet ring master field 605, control blade master field 610, blade characteristics field 615, connection state field 620, blade ID field 625, and marker field 630.

Packet ring master field 605 contains an indication of whether the originating blade is the current packet ring token master blade. Control blade master field 610 contains an indication of whether the blade is the control blade master. Blade characteristics field 615 specifies per-blade characteristics, which is information that can be used to distinguish the features of the blade.

Connection state field 620 contains an indication of the blade's current connection state for its primary and protect ring neighbors. Connection state field 620 allows blades to only switch-in a neighboring blade when both blades agree that the connection is good. It also allows blades that detect a connection fault to notify their neighbor before switching out. This prevents situations where one side of a connection switches while the other side does not, causing a long-term break in the packet ring.

Blade ID field 625 contains a slot identifier for the associated blade. Marker field 630 identifies this marker as a blade discovery marker.

What is claimed is:

1. A method for detecting nodes in a ring computer network, comprising:
   determining whether an arbitration token having an embedded node identifier has arrived at a first node of a plurality of nodes associated with the ring computer network within a preselected network timeout period;
   if the arbitration token has not arrived within the preselected network timeout period, regenerating the arbitration token;
   receiving the arbitration token at a second node;
   determining at the second node whether the arbitration token was modified by a higher priority node of the plurality of nodes by comparing the embedded node identifier with a node identifier associated with the second node;
   if the embedded node identifier represents a lower priority than the node identifier associated with the second node, then replacing the embedded node identifier with the node identifier associated with the second node;
   if the embedded node identifier represents a priority equal to that of the node identifier associated with the second node, then, transmitting a packet containing a first discovery marker periodically from the second node;
   receiving the packet at a third node;
   for each discovery marker in the packet, saving topology information associated with said each discovery marker;
   adding a third node discovery marker to the packet when the packet does not contain the third node discovery marker, wherein the third node discovery marker comprises topology information associated with the third node; and
   sending the packet to a next node of the plurality of nodes.

2. The method of claim 1, further comprising:
   when the packet contains a discovery marker associated with the second node, clearing old topology information on the third node prior to saving the topology information associated with the discovery marker associated with the second node.

3. The method of claim 1, further comprising:
   when the packet does contain the first discovery marker, removing the first discovery marker from the packet.

4. The method of claim 1, wherein the topology information further comprises:
   a connection state, a control master state, and node characteristics.

5. The method of claim 1, wherein said each discovery marker further comprises:
   a packet ring master field;
   a control master field; and
   the topology information.

6. The method of claim 1, wherein the plurality of nodes comprise blades in a switch.

7. A computer-readable media comprising instructions, which when read and executed by a computer cause the computer to perform a method comprising:
   detecting arrival of an arbitration token having an embedded node identifier;
   if the arbitration token does not arrive within a preselected network timeout period, regenerating the arbitration token;
   receiving the arbitration token at a first node of a plurality of nodes of a ring computer network;
   determining at the first node whether the arbitration token was modified by a higher priority node of the plurality of nodes by comparing the embedded node identifier with a node identifier associated with the first node;
   if the embedded node identifier represents a lower priority than the node identifier associated with the first node then replacing the embedded node identifier with the node identifier associated with the first node;
   if the embedded node identifier represents a priority equal to that of the node identifier associated with the first node then, transmitting a packet containing a first discovery marker periodically from the first node;
   receiving the packet at a second node of the plurality of nodes;
   for each discovery marker in the packet, saving topology information associated with said each discovery marker;
   adding a second node discovery marker associated with the second node to the packet when the packet does not contain the second node discovery maker, wherein the second node discovery marker comprises topology information associated with the second node; and
   sending the packet to a next node of the plurality of nodes.

8. The computer-readable media of claim 7, wherein the method further comprises:
   when the packet contains a discovery marker associated with the first node, clearing old topology information on the second node prior to saving the topology information associated with the discovery marker associated with the first node.

9. The computer-readable media of claim 7, wherein the method further comprises:
   when the packet does contain the first discovery marker, removing the first discovery marker from the packet.

10. The computer-readable media of claim 7, wherein the topology information further comprises: a connection state, a control master, and node characteristics.

11. The computer-readable media claim 7, wherein said each discovery marker further comprises:
   a packet ring master field;
   a control master field; and
   the topology information.

12. A method comprising:
   generating an arbitration token having an embedded node identifier and transmitting the arbitration token to a next node of a plurality of nodes;

circulating the arbitration token among the plurality of nodes associated with a ring computer network by a first node of the plurality of nodes;

when the arbitration token is received by the next node, replacing the embedded node identifier with a node identifier associated with the next node if the node identifier associated with the next node is of a higher priority than the embedded node identifier;

if the arbitration token has not arrived back at the first node within the preselected network timeout period, then regenerating the arbitration token;

after the arbitration token has been circulated among the plurality of nodes and is received by the first node:

determining whether the arbitration token was modified by a higher priority node of the plurality of nodes by comparing the embedded node identifier with a node identifier associated with the first node;

if the embedded node identifier has a priority equal to that of the node identifier associated with the first node, then transmitting a packet containing a first discovery marker periodically from the first node;

receiving the packet at a second node of the plurality of nodes;

for each discovery marker in the packet, the second node saving topology information associated with said each discovery marker;

the second node adding a second node discovery marker to the packet when the packet does not contain the second node discovery marker, wherein the second node discovery marker comprises topology information associated with the second node; and after the second node discovery marker has been added to the packet, the second node sending the packet to a subsequent node of the plurality of nodes.

13. The method of claim 12, further comprising when the packet contains a discovery marker associated with the first node, clearing old topology information on the second node associated with the first node prior to saving the topology information associated with the discovery marker that is associated with the first node.

14. The method of claim 12, further comprising when the packet does contain the second discovery marker, removing the second discovery marker from the packet.

15. The method of claim 12, wherein the topology information comprises a connection state, a control master state, and node characteristics.

16. The method of claim 12, wherein said each discovery marker further comprises:

a packet ring master field;

a control master field; and the topology information.

17. The method of claim 12, wherein the plurality of nodes comprise blades in a switch.

* * * * *